(12) United States Patent
Gaudszun et al.

(10) Patent No.: US 11,794,805 B2
(45) Date of Patent: Oct. 24, 2023

(54) METHOD AND ARRANGEMENT FOR ENSURING ROAD TRACKING UP TO A PREDEFINED LATERAL ACCELERATION LIMIT USING A PID CONTROLLER IN A VEHICLE

(71) Applicants: ZENUITY AB, Gothenburg (SE); VOLVO CAR CORPORATION, Gothenburg (SE)

(72) Inventors: Benjamin Gaudszun, Bibertal (DE); Jan Veen, Munich (DE); Tanja Reber, Gröbenzell (DE); Marcus Löfgren, Onsala (SE)

(73) Assignees: Zenuity AB, Gothenburg (SE); VOLVO CAR CORPORATION, Gothenburg (SE)

( * ) Notice: Subject to any disclaimer, the term of this patent is extended or adjusted under 35 U.S.C. 154(b) by 270 days.

(21) Appl. No.: 17/193,315

(22) Filed: Mar. 5, 2021

(65) Prior Publication Data
US 2021/0276619 A1    Sep. 9, 2021

(30) Foreign Application Priority Data

Mar. 6, 2020    (EP) .................................. 20161503

(51) Int. Cl.
*B62D 15/02* (2006.01)
*B62D 6/00* (2006.01)

(52) U.S. Cl.
CPC ............. *B62D 6/003* (2013.01); *B62D 6/008* (2013.01); *B62D 15/021* (2013.01)

(58) Field of Classification Search
None
See application file for complete search history.

(56) References Cited

U.S. PATENT DOCUMENTS

| | | | | |
|---|---|---|---|---|
| 2007/0021889 A1* | 1/2007 | Tsuchiya | ................ | B62D 1/286 701/41 |
| 2011/0010054 A1* | 1/2011 | Wilson-Jones | .......... | B62D 6/00 701/41 |

(Continued)

FOREIGN PATENT DOCUMENTS

| | | | | |
|---|---|---|---|---|
| CN | 107161210 A | * | 9/2017 | ........... B62D 5/0418 |
| EP | 3153147 A1 | * | 4/2017 | ............... A61H 3/04 |

(Continued)

OTHER PUBLICATIONS

Han et al., "The Lateral Tracking Control for the Intelligent Vehicle Based on Adaptive PID Neural Network", Sensors 2017, 17, 1244 (Year: 2017).*

(Continued)

*Primary Examiner* — Anne Marie Antonucci
*Assistant Examiner* — Amelia Vorce
(74) *Attorney, Agent, or Firm* — SAGE PATENT GROUP (57) ABSTRACT

Methods for ensuring road tracking up to a predefined lateral acceleration limit in a vehicle having an autonomous steering function arranged to selectively apply a steering wheel overlay torque to a normal steering assistance torque in an electrical power assisted steering system of the vehicle are provided. Such methods include acquiring the predetermined lateral acceleration limit; acquiring a signal representing a current lateral acceleration of the vehicle; comparing the predetermined lateral acceleration limit with the acquired current lateral acceleration signal to obtain a controller error; setting a torque limit for the steering wheel overlay torque; and subjecting the controller error to a proportional-integral-derivative (PID) controller, which is arranged to provide the torque limit for the steering wheel overlay torque after setting the torque limit to the initial value.

15 Claims, 3 Drawing Sheets

(56) References Cited

U.S. PATENT DOCUMENTS

| | | | |
|---|---|---|---|
| 2012/0109416 A1* | 5/2012 | Mizutani | B60W 50/045 701/1 |
| 2013/0079988 A1* | 3/2013 | Hirao | B60W 10/184 701/38 |
| 2014/0032049 A1 | 1/2014 | Moshchuk et al. | |
| 2016/0303485 A1* | 10/2016 | Kawamura | B62D 6/003 |
| 2016/0362972 A1* | 12/2016 | Dykstra | E21B 4/02 |
| 2017/0151979 A1* | 6/2017 | Maeda | B62D 5/0481 |
| 2018/0178839 A1* | 6/2018 | Ide | B62D 15/029 |
| 2018/0339725 A1* | 11/2018 | Kodera | B62D 5/046 |
| 2018/0348769 A1* | 12/2018 | Sato | G05D 1/0214 |
| 2019/0039648 A1* | 2/2019 | Kitta | B62D 5/0463 |
| 2019/0126977 A1 | 5/2019 | Kim et al. | |
| 2019/0202454 A1* | 7/2019 | Komiyama | G08G 1/166 |
| 2019/0202497 A1* | 7/2019 | Hajika | G05B 6/02 |
| 2019/0270437 A1* | 9/2019 | Miller, Jr. | B62D 6/003 |
| 2020/0172164 A1* | 6/2020 | Mitsumoto | B62D 15/021 |
| 2020/0307687 A1* | 10/2020 | Meyer | B62D 5/0472 |
| 2020/0406964 A1* | 12/2020 | Hultéen | B62D 6/008 |
| 2021/0107567 A1* | 4/2021 | Varunjikar | B62D 15/0265 |
| 2021/0245800 A1* | 8/2021 | Kitazume | B62D 5/0463 |
| 2022/0009547 A1* | 1/2022 | Osajima | B62D 5/0463 |

FOREIGN PATENT DOCUMENTS

| | | | |
|---|---|---|---|
| EP | 3611078 A1 | 2/2020 | |
| JP | 2014192929 A * | 10/2014 | B60L 15/20 |

OTHER PUBLICATIONS

Kim et al., "Torque-Overlay-Based Robust Steering Wheel Angle Control of Electrical Power Steering for a Lane-Keeping System of Automated Vehicles", IEEE Transactions On Vehicular Technology, vol. 65, No. 6, Jun. 2016 (Year: 2016).*

Extended European Search Report dated May 15, 2020 for European Patent Application No. 20161503.6, 10 pages.

Rajamani, Rajesh; "Vehicle Dynamics and Control," Second Edition; Chapter 2 titled "Lateral Vehicle Dynamics", published 2012 by Springer US; pp. 20-31 (15 pages).

* cited by examiner

METHOD AND ARRANGEMENT FOR ENSURING ROAD TRACKING UP TO A PREDEFINED LATERAL ACCELERATION LIMIT USING A PID CONTROLLER IN A VEHICLE

CROSS-REFERENCE TO RELATED APPLICATIONS

The present application for patent claims priority to European Patent Office Application Ser. No. 20161503.6, entitled "METHOD AND ARRANGEMENT FOR ENSURING ROAD TRACKING UP TO A PREDEFINED LATERAL ACCELERATION LIMIT USING A PID CONTROLLER IN A VEHICLE" filed on Mar. 6, 2020, assigned to the assignee hereof, and expressly incorporated herein by reference.

TECHNICAL FIELD OF THE INVENTION

The present disclosure relates generally to a method and an arrangement for ensuring road tracking up to a predefined lateral acceleration limit using a proportional-integral-derivative, PID, controller in a vehicle having an autonomous steering function arranged to selectively apply a steering wheel overlay torque to a normal steering assistance torque in an electrical power assisted steering system of the vehicle. It also relates to a vehicle comprising such an arrangement.

BACKGROUND

The use of power steering in vehicles is well known, e.g., the use of electrical power assisted steering, EPAS. Such electrical power assisted steering includes electric motors that assist a driver of a vehicle by adding an assistive torque to, e.g., a steering column of the vehicle. EPAS systems are used in vehicles, such as cars, lorries, buses and trucks.

It is further known to use advanced driver assistance systems, ADAS, to help a driver of a vehicle in the driving process. Such ADAS systems include autonomous steering systems, such as so-called automatically commanded steering function, ACSF, systems. ACSF systems usually rely on a combination of camera and radar sensors to combine lane departure avoidance, LDA, also called lane keeping aid, LKA, with an adaptive cruise-control functionality, to help a driver to drive a vehicle between lane side markers combined with keeping a preset distance to a preceding vehicle.

ACSF systems are thus provided to help a driver of a vehicle maintain the vehicle in a desired lane whilst keeping a safe preset distance to a preceding vehicle. For lane keeping aid or lane centering systems where an EPAS is used, a steering wheel torque overlay, i.e., additional steering wheel torque on top of what would have been obtained by a base assist of the EPAS, is used for lateral position control.

As of 2018, ADAS functions are subject to Harmonized Technical United Nations Regulations for Wheeled Vehicles and regulated under R79 UNECE. The implication of this regulation is that an ACSF function must, during good sensor conditions, guarantee road tracking up to a predefined lateral acceleration level which is decided by an Original Equipment Manufacturer, OEM. Moreover, an ACSF function is considered to be in violation of R79 if a road is tracked with a lateral acceleration that is 0.3 m/s2 higher than the predefined lateral acceleration level.

A straightforward technical solution to comply with R79 would be to reduce the vehicle speed so that the ACSF path can be tracked with a lateral acceleration that is lower than the predefined lateral acceleration level. This may be done using a so-called Curve Speed Adaptation, CSA, system.

A Curve Speed Adaptation system aims to adapt the speed for an upcoming curve. Such a system aims to mimic a driver and take into consideration how the driver would behave if he/she were to drive. However, ACSF functionality may be provided both with and without Curve Speed Adaptation.

Without Curve Speed Adaptation a technical solution for R79 could be that the ACSF function simply limits the path curvature to incur a lateral acceleration that is always lower than the predefined lateral acceleration. In a sharp curve to the left this would mean that ACSF would plan a path with a smaller curvature (higher radius) that leaves the road to the right.

A problem with only limiting the path curvature is that the driver will get an experience that the wheel angle controller controls the steering wheel along a path that moves the vehicle out of lane. In the left curve example described above, this would mean that a driver will in a hands-on situation experience that the ACSF function applies torque to the right.

SUMMARY OF THE INVENTION

An object of the present disclosure is to provide an improved method and arrangement for ensuring road tracking up to a predefined lateral acceleration limit in a vehicle having an autonomous steering function. It is further an object of the disclosure to provide a vehicle comprising the arrangement.

According to a first aspect, there is provided a method for ensuring road tracking up to a predefined lateral acceleration limit in a vehicle having an autonomous steering function arranged to selectively apply a steering wheel overlay torque to a normal steering assistance torque in an electrical power assisted steering system of the vehicle. According to the method the predetermined lateral acceleration limit is acquired or set and a signal representing a current lateral acceleration of the vehicle is acquired. The predetermined lateral acceleration limit is compared with the acquired current lateral acceleration signal to obtain a controller error. In particular, the predetermined lateral acceleration limit may be subtracted from the acquired current lateral acceleration signal to obtain the controller error. The obtained controller error is observed and if it is observed that the controller error is equal to or greater than, i.e., exceeds, a predetermined first threshold, a torque limit is set to the actual value of the steering wheel overlay torque as an initial value for the torque limit. The controller error is further subjected to a PID controller, which is arranged to provide the torque limit for the steering wheel overlay torque after setting the torque limit to the initial value. The torque limit output by the PID controller limits the steering wheel overlay torque, which is applied to the normal steering assistance torque.

In a further embodiment, the predetermined first threshold is zero, which means that if the current lateral acceleration becomes equal to or greater than the predetermined lateral acceleration limit, the torque limit is set to the actual value measured for the steering wheel overlay torque as the initial value for the torque limit. After the torque limit has been set to the initial value, the PID controller determines the torque limit. It is also possible to use other values than zero for the first threshold.

In a yet a further embodiment, the method comprises that the torque limit is the upper torque limit or the lower torque limit. The upper limit places an upper limit on the steering wheel overlay torque, and the lower limit places a lower limit on the steering wheel overlay torque. The PID controller may also be configured to output the upper limit and the lower limit.

In an additional embodiment, the torque limit for the steering wheel overlay torque has a predetermined default value before the torque limit is set to the initial value and the PID controller starts generating the torque limit.

In a further embodiment, the method further comprises activating the PID controller when the controller error becomes equal to or greater than the predetermined first threshold, a driver is not interacting with a steering wheel of the vehicle and the I part of the PID controller is not in saturation. Only when all three conditions are fulfilled, the PID controller gets active and outputs the torque limit for the steering wheel overlay torque in this embodiment.

In a yet further embodiment, the method further comprises inactivating the PID controller when the driver is interacting with the steering wheel, the I part of the PID controller is in saturation or a switch off timer, which was started when the controller error dropped below the predetermined first threshold, has elapsed. Thus, if at least one of the aforementioned conditions is fulfilled, the PID controller gets inactive and stops outputting the torque limit for the steering wheel overlay torque. After the PID controller got inactive, the torque limit may ramp to its default value.

In a still further embodiment, the method helps to calm down the PID controller after a driver interaction. In this embodiment the method comprises observing whether the controller error becomes equal to or greater than a predetermined second threshold that is greater than the predetermined first threshold. In addition, the method observes when the driver stops interacting with the driving wheel. If this happens, a timer is started. When the timer has elapsed after a predetermined time, a smoother tuning of the PID controller is activated by reducing at least one of the P part, I part and D part of the PID controller. For example, the P part and the I part are then set to zero and the I part is set to only half of its tuning value.

In an additional embodiment, the method further comprises lowpass filtering the current lateral acceleration signal in order to retrieve a smoother signal.

In yet an additional embodiment, the method further comprises using an ACSF function as the autonomous steering function.

In a still further embodiment, the method comprises acquiring a signal representing a speed of the vehicle and tuning a P gain of the PID controller depending on the speed of the vehicle.

In a further embodiment, the PID controller is replaced by another controller. The PID controller may, for example, be replaced by a single-input single-output, SISO, regulatory controller called predictive feedback controller, PFC. The PFC controller combines the time delay compensation capabilities of predictive control algorithms, the input reconstruction capabilities of inferential control schemes to improve disturbance rejection, and the adaptation capabilities of switching controllers. Another alternative for the PID controller is a lead-lag compensator.

In an embodiment, all steps of the method are performed in the vehicle. In a further embodiment, the method is partially or even completely performed outside the vehicle, for example, in a cloud or any other suitable unit outside the vehicle. Wireless communication may be used to transfer data to and from the vehicle.

According to a second aspect, there is provided an arrangement for ensuring road tracking up to a predefined lateral acceleration limit in a vehicle having an autonomous steering function arranged to selectively apply a steering wheel overlay torque to a normal steering assistance torque in an electrical power assisted steering system of the vehicle. The arrangement comprises a closed loop controller having a comparator for comparing a predetermined lateral acceleration limit with an acquired current lateral acceleration signal of the vehicle to obtain a controller error; a lateral acceleration limiter which is arranged to set a torque limit for the steering wheel overlay torque, if the controller error is equal to or greater than a predetermined first threshold, to the actual value of the steering wheel overlay torque as an initial value for the torque limit; and a PID controller, which is arranged to receive the controller error and output the torque limit for the steering wheel overlay torque after setting the torque limit to the initial value. The closed loop controller may comprise the lateral acceleration limiter and the PID controller. Further, the lateral acceleration limiter may comprise the PID controller. The comparator may be a subtractor for subtracting the predetermined lateral acceleration limit from the acquired current lateral acceleration signal of the vehicle to obtain the controller error.

In a further embodiment, the arrangement further comprises activating the PID controller when the controller error becomes equal to or greater than the predetermined first threshold, a driver is not interacting with a steering wheel of the vehicle and the I part of the PID controller is not in saturation.

In yet a further embodiment, the arrangement further comprises inactivating the PID controller when the driver is interacting with the steering wheel, the I part of the PID controller is in saturation or a switch off timer, which was started when the controller error dropped below the predetermined first threshold, has elapsed.

In a still further embodiment, the arrangement further comprises reducing at least one of the P part, I part and D part of the PID controller when a predetermined time has elapsed after the driver interacted with the steering wheel and the controller error became equal to or greater than a predetermined second threshold that is greater than the predetermined first threshold.

In an additional embodiment, the arrangement further comprises a lowpass filter arranged to filter a current lateral acceleration signal to retrieve a smoother signal.

In yet an additional embodiment, the arrangement further comprises that the autonomous steering function is an ACSF function.

In a further embodiment, the arrangement is further arranged to acquire a signal representing a speed of the vehicle and tune a P gain of the PID controller depending on the speed of the vehicle.

The arrangement according to the second aspect may comprise the embodiments disclosed herein in connection with the method according to the first aspect.

According to a third aspect, there is provided a vehicle that comprises an arrangement according to the second aspect.

The above embodiments have the beneficial effects of ensuring road tracking up to a predefined lateral acceleration limit in a vehicle having an autonomous steering function.

BRIEF DESCRIPTION OF FIGURES

In the following, embodiments herein will be described in greater detail by way of example only with reference to attached drawings, in which.

DETAILED DESCRIPTION

Figure 1:
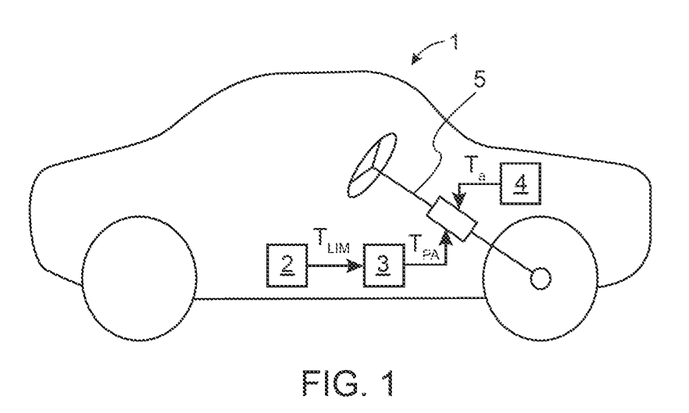
FIG. 1 schematically illustrates a vehicle that comprises an arrangement for ensuring road tracking up to a predefined lateral acceleration limit according to an example embodiment.

FIG. 1 schematically illustrates a vehicle 1 including an arrangement 2 for ensuring road tracking up to a predefined lateral acceleration limit a_(lat,R79). Further, the vehicle 1 includes an autonomous steering function 3 and an electrical power assisted steering system 4.

The autonomous steering function 3 may be an ACSF system arranged to selectively apply, to e.g., a steering column 5 or equivalent, a steering wheel overlay torque $T_{PA}$ to a normal steering assistance torque $T_a$ of the electrical power assisted steering system 4, i.e., applying an additional steering wheel torque $T_{PA}$ on top of what would have been provided by a base assist of the electrical power assisted steering system 4.

In order to understand how a driver of the vehicle 1 experiences steering wheel overlay torque $T_{PA}$ from the autonomous steering function 3, such as an ACSF function, we first need to establish a model of the steering dynamics of the vehicle 1 steering system.

The steering system dynamics can be modelled with newtons second law $$J_s \ddot{\theta} = B(\dot{\theta},\theta) + \beta F_r(\theta,v,m,J_v,c_f,c_r,l_r) + \gamma T_a(\ddot{\theta},\dot{\theta},\theta,v,T_c) + \gamma T_{PA} + T_c \quad (Eq.1)$$

In steady state: $\ddot{\theta}=0$, $\dot{\theta}=0$ $$0 = \beta F_r(\theta,v,m,J_v,c_f,c_r,l_r) + \gamma T_a(\theta,v,T_c) + \gamma T_{PA} + T_c \quad (Eq.2)$$

$\theta$: Steering wheel angle, $J_s$: inertia of steering system, B: mechanical damping of steering system, $\beta$: mechanical ratio converting from lateral force on the wheels to torque on the steering wheel, $F_r$: wheel forces, v: vehicle speed, m: vehicle mass, $J_v$: vehicle inertia, $c_f$: cornering stiffness front (tyre parameter), $c_r$: cornering stiffness rear (tyre parameter), $l_r$: distance from rear wheels axis to centre of gravity, $\gamma$: mechanical ratio converting from torque at the electrical power assist motor to torque on the steering wheel, $T_a$: torque from the electrical power assist, $T_{PA}$: overlay torque from the ACSF function, $T_c$: steering wheel column torque.

Equation 2 above shows the torque balance in a steady state cornering situation. The well-known kinetic bicycle model, e.g. as described by Rajamani, Rajesh, "Vehicle Dynamics and Control" Second Edition, Chapter 2 titled "Lateral Vehicle Dynamics", Springer US, Published 2012, pp. 20-31, gives that for a given mass, inertia and tyres, the wheel forces are well approximated as linear in the lateral acceleration, as illustrated in Equation 3 below $$F_r(\theta,v,m,J_v,c_f,c_r,l_r) \approx k(m,J_v,c_f,c_r,l_r)a_{lat}. \quad (Eq. 3).$$

In steady state at the R79 UNECE acceleration limit $a_{lat,R79}$ the following relation, Equation 4, approximately holds $$k(m, J_v, c_f, c_r, l_r)a_{lat,R79} = -\frac{\gamma}{\beta}T_a(\theta, v) - \frac{\gamma}{\beta}T_{PA,R79} \quad (Eq. 4)$$

where $\gamma T_a$ ($\theta$, v) corresponds to an active return functionality. An active return functionality applies a torque opposite to a steering wheel torque, in order to return the steering wheel angle to 0°. This functionality can be seen when the driver releases the steering wheel and the steering wheel slowly returns to a 0° steering wheel angle.

Since the purpose of the ACSF function is to assist the driver of the vehicle 1 in tracking a path, both steering wheel column torque $T_c$ and torque $T_a$ from the electrical power assisted steering system 4 will be close to zero as long as a driver is not actively steering, overriding or assisting the ACSF function.

In a steady state cornering situation overlay torque $T_{PA}$ from the ACSF function must counteract the wheel forces $F_r$. If the driver of the vehicle 1 keeps his or her hands on the steering wheel and has a desire to stay in lane during a steady state cornering situation, a reduction of overlay torque $T_{PA}$ from the ACSF function must be balanced out by an increase in steering wheel column torque $T_c$. The increase in steering wheel column torque $T_c$ is provided by the driver's hands which means that the driver will experience the reduction in overlay torque $T_{PA}$ from the ACSF function as if the ACSF function is pulling the steering wheel towards a path that leaves the lane.

The proposed technical solution aims at saturating the ACSF overlay torque $T_{PA}$ at a torque limit close to a torque from the ACSF function $T_{PA,R79}$, which in steady state results in the predefined R79 lateral acceleration, $a_{lat,R79}$.

If the overshoot in torque $T_{PA}$ from the ACSF function above $T_{PA,R79}$ is small, the driver will get the experience that the ACSF function does it best to keep the road curvature but that the function is not strong enough and needs some torque assistance from the driver in order to keep the vehicle 1 in lane during a steep curve.

A challenge is that the torque $T_{PA,R79}$ from the ACSF function, which in steady state results in the predefined R79 lateral acceleration, $a_{lat,R79}$, is strongly dependent on the mass, inertia, tyres, centre of gravity and electrical power assistance, $T_a$, which all are parameters that vary between drive cycles and variants of the type of the vehicle 1.

In order to be robust against variations in mass, inertia, centre of gravity and to tuning of the electrical power assistance, $T_a$, feedback on lateral acceleration $a_{lat}$ is used to control the ACSF overlay torque limits close to the torque $T_{PA,R79}$ from the ACSF function, which in steady state results in the predefined R79 lateral acceleration, $a_{lat,R79}$.

Figure 2:
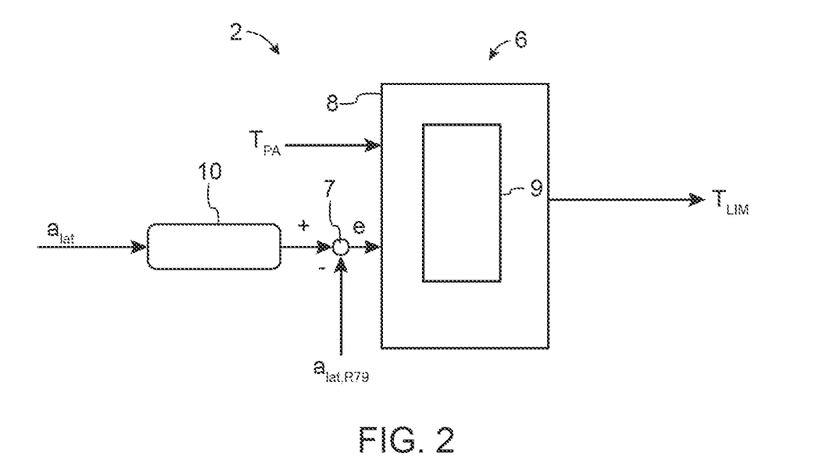
FIG. 2 schematically illustrates a closed loop controller of an arrangement for ensuring road tracking up to a predefined lateral acceleration limit in a vehicle according to an example embodiment.

A block diagram of an example embodiment of the arrangement 2 for ensuring road tracking up to a predefined lateral acceleration limit $a_{lat,R79}$ comprising a closed loop controller 6 suitable for use with the proposed method is illustrated in FIG. 2.

The current lateral acceleration signal $a_{lat}$ is received from an acceleration sensor and is preferably lowpass filtered 10 to retrieve a smoother signal.

A controller error e, which may also be denoted as lateral acceleration error, is obtained by subtracting a predetermined lateral acceleration limit $a_{lat,R79}$ from the lowpass filtered current lateral acceleration $a_{lat}$, thus it holds $e=a_{lat}-a_{lat,R79}$. The controller error e then enters a lateral acceleration limiter 8. In addition, the lateral acceleration limiter 8 receives the actual steering wheel overlay torque $T_{P4}$. The lateral acceleration limiter 8 further includes a proportional-integral-derivative, PID, controller 9. The lateral acceleration limiter 8 outputs a torque limit $T_{LIM}$ for the steering wheel overlay torque $T_{P4}$.

Figure 3:
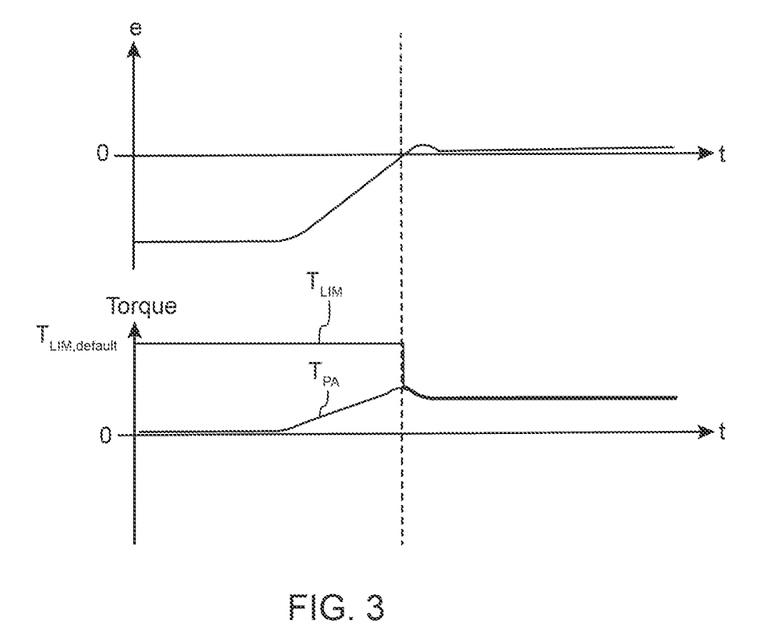
FIG. 3 schematically illustrates diagrams depicting a controller error e, a steering wheel overlay torque T_PA and a torque limit T_LIM over time according to an example embodiment.

The operating principle of the lateral acceleration limiter 8 shall be explained with the help of FIG. 3. The upper diagram in FIG. 3 illustrates the controller error e over time. The lower diagram in FIG. 3 illustrates the steering wheel overlay torque $T_{P4}$ and the torque limit $T_{LIM}$ over time.

The scenario shown in FIG. 3 is that the vehicle 1 drives straight on with a constant velocity. The vehicle 1 then enters a curve and the steering wheel overlay torque $T_{P4}$ ramps up smoothly, which leads to an increase of the lateral acceleration $a_{lat}$ and thus an increase of the controller error e.

As long as the controller error e is below a predetermined first threshold, which is equal to zero in the present example embodiment, the lateral acceleration limiter 8 outputs a default value $T_{LIM,default}$ for the torque limit $T_{LIM}$. As soon as the controller error e becomes equal to or greater than zero, the lateral acceleration limiter 8 sets the torque limit $T_{LIM}$ to the actual value of the steering wheel overlay torque $T_{P4}$ that is currently applied to the steering wheel servo motor. The instance in time when the controller error e becomes zero and the torque limit $T_{LIM}$ is set to the actual value of the steering wheel overlay torque $T_{P4}$ is indicated by a dashed line in FIG. 3.

In addition, the actual value of the steering wheel overlay torque $T_{P4}$, when the controller error e becomes zero, is saved and input into the PID controller 9 as an initial value. Starting from this instance in time, the PID controller 9 generates the torque limit $T_{LIM}$ for the steering wheel overlay torque $T_{P4}$, which is output by the lateral acceleration limiter 8. The PID controller 9 uses the initial value as the starting value for generating the torque limit $T_{LIM}$. The PID controller 9 controls the torque limit $T_{LIM}$ fast and smoothly without losing time.

An advantage of the arrangement 2 illustrated in FIG. 2 is that there is no time delay to get the torque limit $T_{LIM}$ for the steering wheel overlay torque $T_{P4}$ and steady state is reached fast. In addition, overshoots are small and the PID controller 9 uses a smooth starting point. The PID controller 9 further has a dynamic and damping part next to the integral part.

The PID controller 9 may generate an upper torque limit $T_{LIM,upper}$ and/or a lower torque limit $T_{LIM,lower}$ for the steering wheel overlay torque $T_{P4}$. The upper torque limit $T_{LIM,upper}$ and/or the lower torque limit $T_{LIM,lower}$ can be input into a pinion angle controller. The pinion angle controller further receives the current pinion angle and a pinion angle request and uses the input values to generate a torque request, which is within the range limited by the upper torque limit $T_{LIM,upper}$ and/or the lower torque limit $T_{LIM,lower}$.

The PID controller 9 requires that only its P gain needs to be tuned for different speeds of the vehicle 1 according to the oscillatory method from Ziegler and Nichols, which method is well known to a skilled person.

The PID controller 9 may be a digital controller. The PID controller 9 calculates a control deviation for consecutive time instances t and applies a correction based on proportional (P), integral (I) and derivative (D) parts in order to receive a command signal. The control deviation is the controller error e.

The control deviations are summed up for each time t. Thus, the new sum of control deviations for each time t is calculated by adding the current control deviation to the old sum of control deviations:

sum_of_control_deviation_new=sum_of_control_deviation_old+
control_deviation   (Ep. 5).

The P, I and D parts are calculated by using the following equations, where $k_p$, $k_i$ and $k_d$ denote the gains of the proportional, integral, and derivative parts, respectively, $T_s$ is the sample time, control_deviation is the control deviation currently measured and control_deviation_old is the previously measured control deviation:

p_part=$k_p$*control_deviation   (Ep. 6)

i_part=$k_i$*$T_s$*sum_of_control_deviation_new   (Ep. 7)

d_part=$k_d$*(control_deviation−control_deviation_old)/$T_s$   (Eq. 8).

The command signal is the sum of the P, I and D parts at time t:

command_signal=p_part+i_part+d_part   (Ep. 9).

The torque limit $T_{LIM}$, which can be the upper the torque limit $T_{LIM,upper}$ or the lower torque limit $T_{LIM,lower}$, is calculated by subtracting the command signal from the initial value $T_{LIM,init}$, which was saved when the controller error e became equal to or greater than zero:

$T_{LIM}=T_{LIM,init}$−command_signal   (Ep. 10).

The PID controller 9 may get active when all of the following conditions are fulfilled:
(1) the controller error e becomes equal to or greater than zero,
(2) the driver of the vehicle 1 is not interacting with the steering wheel, for example, the driver does not exert torque on the steering wheel, and
(3) the I part of the PID controller 9 is not in saturation.

When all conditions (1)-(3) are fulfilled, the PID controller 9 gets active and outputs the torque limit $T_{LIM}$ for the steering wheel overlay torque $T_{P4}$.

The PID controller 9 may get inactive when at least one of the following is fulfilled:
(1) the driver is interacting with the steering wheel, for example, the driver exerts torque on the steering wheel,
(2) the I part of the PID controller 9 is in saturation, and
(3) a switch off timer, which was started when the controller error e dropped again below zero, has elapsed.

When the I part of the PID controller 9 is in saturation, the PID controller 9 may be not tuned correctly or it does not make sense to further control anymore.

When the PID controller 9 is active, but the controller error e has been below zero for a longer time, no control is needed and the PID controller 9 shall be switched off. Therefore, the switch off timer is started when the controller error e drops below zero after the activation of the PID controller 9. When the controller error e becomes equal to or greater than zero again while the switch off timer is running, the switch off timer is turned off. However, when the controller error e remains below zero and the switch off timer elapses, the PID controller 9 is deactivated.

When the PID controller 9 gets inactive, it stops outputting the torque limit $T_{LIM}$ for the steering wheel overlay torque $T_{P4}$. After the PID controller 9 got inactive, the torque limit $T_{LIM}$, i.e., the upper the torque limit $T_{LIM,upper}$ and/or the lower torque limit $T_{LIM,lower}$, may ramp to its default value again to not disturb the angle controller.

There are situations where the PID controller 9 has been activated, but then the curve on the road opens up, i.e., the radius becomes larger, and the lateral acceleration $a_{lat}$ goes below the predetermined lateral acceleration limit $a_{lat,R79}$ again. But then the I part of the PID controller 9 runs in the opposite direction until it is saturated. When the PID controller 9 is needed again before it is saturated it may take some seconds until the PID controller 9 gets successful again. Therefore, when the PID controller 9 is active but there is no need to control because the controller error e is below zero, the switch off timer is started. Once the switch off timer has elapsed, the PID controller 9 is switched off until it is needed again. For example, the switch off timer may elapse after 3 seconds.

The lateral acceleration limiter 8 may monitor whether the controller error e becomes equal to or greater than a predetermined second threshold that is greater than the predetermined first threshold, which is zero in the present example embodiment. Further, it is monitored when the driver stops interacting with the driving wheel. If the controller error e becomes equal to or greater than the predetermined second threshold, i.e., a high lateral acceleration $a_{lat}$ occurs, for example, at least 0.5 m/s$^2$ over the predetermined lateral acceleration limit $a_{lat,R79}$, and the driver does not interact with the driving wheel, an additional timer is started. When the timer has elapsed after a predetermined time, a smoother tuning of the PID controller 9 is activated by, for example, setting the P part and the D part to zero and setting the I part to half of its tuning value. This helps after a driver interaction because otherwise the PID controller 9 is too aggressive and it can cause an oscillation.

Figure 4:
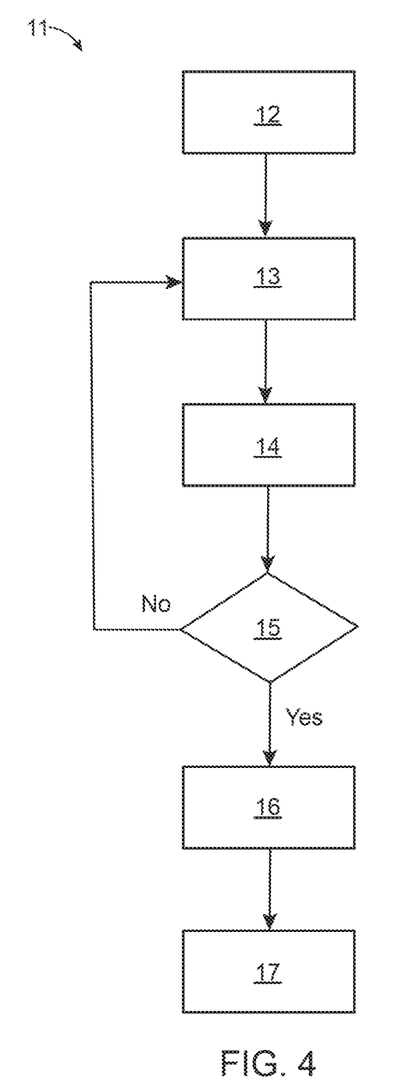
FIG. 4 schematically illustrates a flowchart of a method for ensuring road tracking up to a predefined lateral acceleration limit in a vehicle according to an example embodiment.

FIG. 4 schematically illustrates a flowchart of a method 11 for ensuring road tracking up to the predefined lateral acceleration limit $a_{lat,R79}$ in the vehicle 1 according to an example embodiment.

In step 12 of the method 11, the predetermined lateral acceleration limit $a_{lat,R79}$ is acquired.

In step 13, a signal is acquired that represents the current lateral acceleration $a_{lat}$ of the vehicle 1.

In step 14, the predetermined lateral acceleration limit $a_{lat,R79}$ is compared with the acquired current lateral acceleration signal $a_{lat}$ to obtain the controller error e. In particular, the predetermined lateral acceleration limit $a_{lat,R79}$ is subtracted from the acquired current lateral acceleration signal $a_{lat}$ to obtain the controller error e.

In step 15, it is monitored whether the controller error e becomes equal to or greater than the predetermined first threshold, which is zero in the present example embodiment.

If the controller error e is smaller than zero, the method 11 returns to step 13.

If the controller error e is equal to or greater than zero, the method 11 proceeds to step 16 and the torque limit $T_{LIM}$ for the steering wheel overlay torque $T_{P4}$ is set to the actual value of the steering wheel overlay torque $T_{P4}$ as an initial value for the torque limit $T_{LIM}$.

In step 17, the controller error e is subjected to the PID controller 9, which then starts generating the torque limit $T_{LIM}$ for the steering wheel overlay torque $T_{P4}$.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A method for ensuring road tracking up to a predefined lateral acceleration limit in a vehicle having an autonomous steering function arranged to selectively apply a steering wheel overlay torque to a normal steering assistance torque in an electrical power assisted steering system of the vehicle, the method comprising:
    acquiring the predetermined lateral acceleration limit;
    acquiring a signal representing a current lateral acceleration of the vehicle;
    comparing the predetermined lateral acceleration limit with the acquired current lateral acceleration signal to obtain a controller error;
    setting a torque limit for the steering wheel overlay torque, if the controller error is equal to or greater than a predetermined first threshold, to the actual value of the steering wheel overlay torque as an initial value for the torque limit; and
    subjecting the controller error to a proportional-integral-derivative (PID) controller, which is arranged to provide the torque limit for the steering wheel overlay torque after setting the torque limit to the initial value.

2. The method according to claim 1, further comprising activating the PID controller when the controller error becomes equal to or greater than the predetermined first threshold, a driver is not interacting with a steering wheel of the vehicle and the I part of the PID controller is not in saturation.

3. The method according to claim 1, further comprising inactivating the PID controller when a driver is interacting with a steering wheel, the I part of the PID controller is in saturation or a switch off timer, which was started when the controller error dropped below the predetermined first threshold, has elapsed.

4. The method according to claim 1, further comprising reducing at least one of the P part, I part and D part of the PID controller when a predetermined time has elapsed after a driver interacted with a steering wheel and the controller error became equal to or greater than a predetermined second threshold that is greater than the predetermined first threshold.

5. The method according to claim 1, further comprising lowpass filtering the current lateral acceleration signal.

6. The method according to claim 1, further comprising using an Automatically Commanded Steering Function (ACSF) as the autonomous steering function.

7. The method according to claim 1, further comprising acquiring a signal representing a speed of the vehicle and tuning a P gain of the PID controller depending on the speed of the vehicle.

8. An arrangement for ensuring road tracking up to a predefined lateral acceleration limit in a vehicle having an autonomous steering function arranged to selectively apply a steering wheel overlay torque to a normal steering assistance torque in an electrical power assisted steering system of the vehicle, the arrangement further comprising:
- a closed loop controller having a comparator for comparing a predetermined lateral acceleration limit with an acquired current lateral acceleration signal of the vehicle to obtain a controller error;
- a lateral acceleration limiter arranged to set a torque limit for the steering wheel overlay torque, if the controller error is equal to or greater than a predetermined first threshold, to the actual value of the steering wheel overlay torque as an initial value for the torque limit; and
- a proportional-integral-derivative (PID) controller arranged to receive the controller error and provide the torque limit for the steering wheel overlay torque after setting the torque limit to the initial value.

9. The arrangement according to claim 8, further comprising activating the PID controller when the controller error becomes equal to or greater than the predetermined first threshold, a driver is not interacting with a steering wheel of the vehicle and the I part of the PID controller is not in saturation.

10. The arrangement according to claim 8, further comprising inactivating the PID controller when a driver is interacting with a steering wheel, the I part of the PID controller is in saturation or a switch off timer, which was started when the controller error dropped below the predetermined first threshold, has elapsed.

11. The arrangement according to claim 8, further comprising reducing at least one of the P part, I part and D part of the PID controller when a predetermined time has elapsed after a driver interacted with a steering wheel and the controller error became equal to or greater than a predetermined second threshold that is greater than the predetermined first threshold.

12. The arrangement according to claim 8, further comprising a lowpass filter arranged to filter a current lateral acceleration signal.

13. The arrangement according to claim 8, wherein the autonomous steering function is an Automatically Commanded Steering Function (ACSF).

14. The arrangement according to claim 8, further arranged to acquire a signal representing a speed of the vehicle and tune a P gain of the PID controller depending on the speed of the vehicle.

15. A vehicle comprising an arrangement for ensuring road tracking up to a predefined lateral acceleration limit in a vehicle having an autonomous steering function arranged to selectively apply a steering wheel overlay torque to a normal steering assistance torque in an electrical power assisted steering system of the vehicle, the arrangement further comprising:
- a closed loop controller having a comparator for comparing a predetermined lateral acceleration limit with an acquired current lateral acceleration signal of the vehicle to obtain a controller error;
- a lateral acceleration limiter arranged to set a torque limit for the steering wheel overlay torque, if the controller error is equal to or greater than a predetermined first threshold, to the actual value of the steering wheel overlay torque as an initial value for the torque limit; and
- a proportional-integral-derivative (PID) controller arranged to receive the controller error and provide the torque limit for the steering wheel overlay torque after setting the torque limit to the initial value.

* * * * *